Nov. 23, 1926.
C. C. VAN NUYS
1,607,708
SEPARATION OF THE CONSTITUENTS OF GASEOUS MIXTURES
Filed Oct. 22, 1924
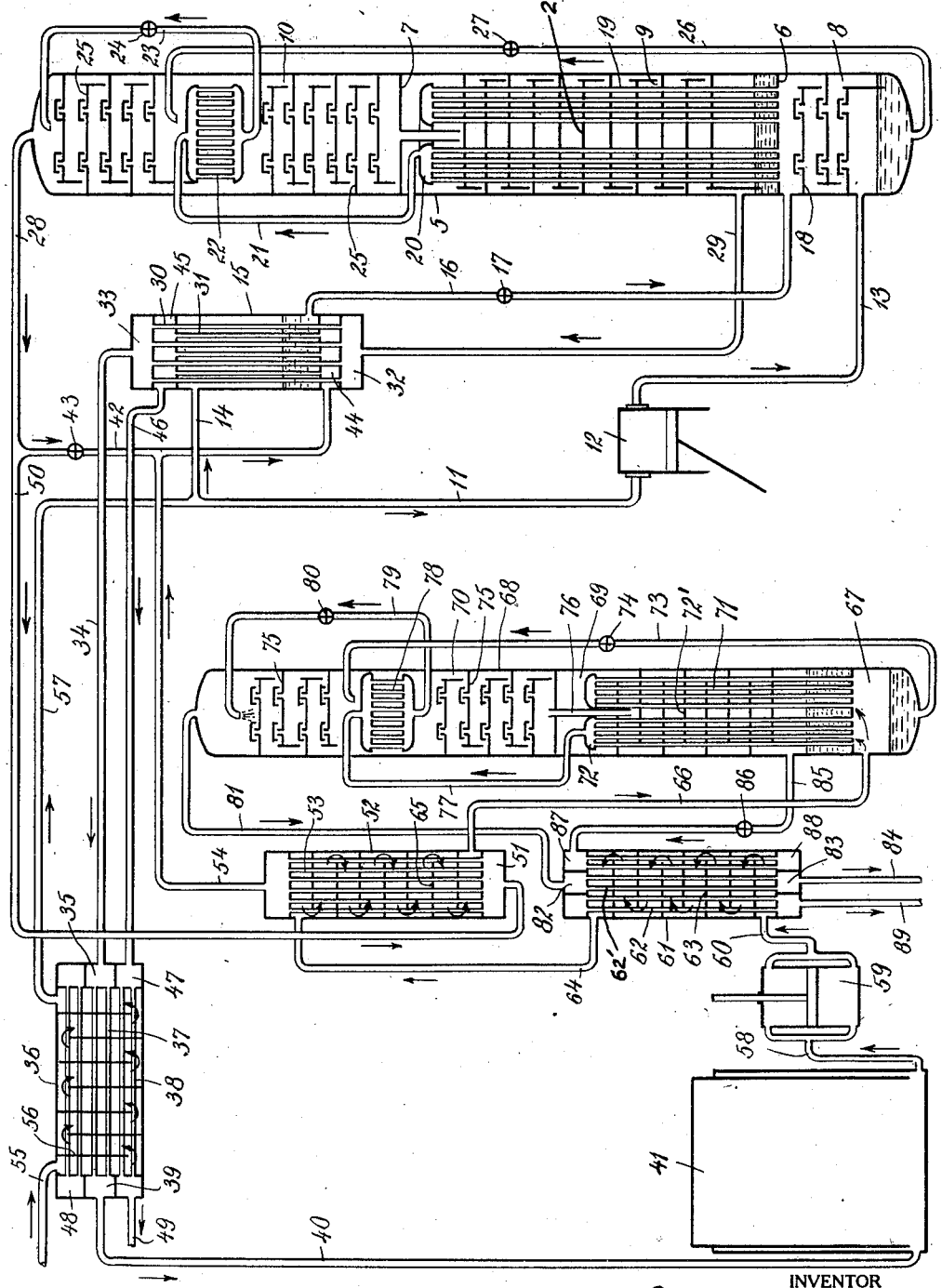
INVENTOR
Claude C Van Nuys
BY
Pennie Davis Marvin & Edmonds
his ATTORNEYS Patented Nov. 23, 1926.

1,607,708

UNITED STATES PATENT OFFICE.

CLAUDE C. VAN NUYS, OF CRANFORD, NEW JERSEY, ASSIGNOR TO AIR REDUCTION COMPANY, INCORPORATED, OF NEW YORK, N. Y., A CORPORATION OF NEW YORK.

SEPARATION OF THE CONSTITUENTS OF GASEOUS MIXTURES.

Application filed October 22, 1924. Serial No. 745,100.

This invention relates to the separation of ternary gaseous mixtures by liquefaction for the purpose of recovering the more important constituents in a substantially pure condition. The method and apparatus hereinafter described are more particularly adapted for the separation of oxygen and nitrogen from air; and the invention contemplates the recovery of substantially all of the oxygen and nitrogen in the air in an economical manner, the argon, together with relatively small amounts of oxygen and nitrogen, being rejected or separately recovered. It is to be understood, however, that the invention may be applied to the separation of other gaseous mixtures in which the constituents present physical characteristics similar to those of the constituents of air and that the invention is not limited, therefore, to the treatment of a specific gaseous mixture.

The invention is based upon the method and apparatus devised by Claude and constitutes an improvement thereon. In the Claude method air, for example, is first compressed and passed through a system of temperature exchangers whereby its temperature is reduced by heat interchange with cold gasous products of the separation. The entering air is divided into two portions, the larger of which passes to an expansion engine wherein it is expanded with external work to accomplish a further reduction of temperature. The balance of the cold compressed air is delivered to a liquefier at its initial pressure and is liquefied by heat exchange with cold gaseous products of the separation. The liquid and the cold expanded air are delivered to the column, beneath a tubular vaporizer wherein the unliquefied air is subjected to heat exchange with accumulated bodies of liquid. Selective liquefaction of the air in the tubes as the result of this heat exchange produces a liquid enriched in oxygen which flows backwardly in the tubes and becomes more enriched by the effect of "backward return" while the unliquefied residue passes upwardly from the tubes. The liquid produced in the tubes of the vaporizer combines with the liquid from the liquefier and the combined liquids are delivered to a rectifier in which they flow downwardly in direct contact with vapors arising from the body of liquid surrounding the vaporizer tubes. This causes a further enrichment of the liquid in oxygen by the separation therefrom of the more volatile constituent, nitrogen.

To ensure the more complete separation of the constituents the unliquefied gaseous residue from the vaporizer tubes is liquefied by heat exchange with the liquids first accumulated in the bottom of the column and the liquid nitrogen thus produced is delivered to the top of the rectifier and flows downwardly in contact with the rising vapors. More or less complete rectification is thus obtained, the descending liquid containing a large proportion of the oxygen originally present in the air while the gaseous effluent from the top of the rectifier consists principally of nitrogen. The argon which is present in the air is divided and a portion remains with the liquid which accumulates around the vaporizer tubes while the balance escapes with the nitrogen effluent.

The method as described can be employed with suitable regulation to produce substantially pure oxygen or nitrogen in a similar condition. It is impracticable, however, to produce pure nitrogen and pure oxygen in a single operation, partly by reason of the presence of approximately one per cent of argon in the entering air, but more particularly because the proportions in which oxygen and nitrogen occur in air preclude the operation of the rectifier so that each is separated in a pure condition. Thus, if pure oxygen is desired, the operation of the vaporizer is so regulated that a certain amount of oxygen will escape with the effluent, ensuring that all of the nitrogen will leave the upper end of the rectifier and will not contaminate the oxygen liquid which accumulates around the vaporizer tubes. On the other hand, if pure nitrogen is desired it is found that the amount of nitrogen present in the air is not sufficient to "reflux" all of the oxygen vapors. It is necessary therefore, to withdraw a portion of the accumulated liquid from the vaporizer at intervals. In the first case there is a loss of efficiency due to the oxygen which escapes with the effluent. In the second case there is a loss in efficiency due not only to the removal of the liquid oxygen but also to the necessity of making up the refrigerative losses which accompany the withdrawal of the liquid. These refrigerative losses are met, in the Claude method, by increasing the pressure upon the entering air.

It is the object of the present invention to provide a method of and apparatus for separating the constituents of ternary gaseous mixtures whereby the principal constituents can be recovered continuously in a substantially pure condition with maximum efficiency, and especially to permit the separation of oxygen and nitrogen from air without losing any material portion of these constituents.

Further objects and advantages of the invention will be apparent as it is better understood by reference to the following specification and accompanying drawing in which the preferred form of apparatus for carrying out the invention is illustrated diagrammatically. It is to be understood that details of the apparatus which are well known to those skilled in the art are omitted for the purpose of clarity. The drawing is, therefore, indicative merely of the best arrangement of the essential parts of the apparatus.

In carrying out the invention the liquefaction and rectification are conducted in two successive stages, the primary operation being designed to separate a crude oxygen product containing the argon present in air and a small proportion of nitrogen. The balance of the nitrogen in the air is separated in the primary operation and is recovered substantially uncontaminated with oxygen or argon. The crude oxygen product is then recompressed with a slight additional expenditure of power and is subjected to a further liquefaction and rectification to separate the argon and nitrogen therefrom and to produce a pure oxygen product including substantially all of the oxygen originally present in the air treated. It is possible thus to obtain pure oxygen and pure nitrogen from the air with an expenditure of power not substantially greater than that required to produce pure nitrogen alone in the operation of the Claude method.

The primary operation follows closely the procedure in separating nitrogen from the atmosphere according to the Claude method; that is, the air is compressed to a suitable pressure, e. g., 30 atmospheres, and cooled and a portion is expanded in an engine with external work while the balance is liquefied in the usual liquefier. The liquid is delivered to the column below the vaporizer tubes together with the cold expanded air and the latter is subjected in the tubes to "backward return" condensation to produce an enriched oxygen liquid which combines with that provided by the liquefier. The combined liquids are delivered to the middle portion of the rectifier and serve to liquefy the residual gas from the vaporizer tubes. The liquid nitrogen thus produced is delivered to the top of the rectifier and acts as a "reflux" as it flows downwardly therethrough. The liquid which leaves the bottom of the rectifier and surrounds the vaporizer tubes is a crude oxygen product, the operation being so regulated that the argon and a small proportion of nitrogen remain in this liquid while a pure nitrogen effluent escapes from the top of the rectifier.

Crude oxygen vapor is withdrawn continuously from the space surrounding the vaporizer tubes, and after the refrigerative effect thereof has been utilized in suitable heat exchangers in the system this product is stored in a suitable gas holder from which it is withdrawn and recompressed to a pressure of from three to four atmospheres. This initiates the auxiliary operation in which the crude oxygen product is cooled to a sufficiently low temperature preferably by heat exchange with cold products of the primary operation and is then delivered to the tubes of an auxiliary vaporizer to be there subjected again to "backward return" liquefaction wherein nitrogen and argon are separated in the residual unliquefied gaseous mixture while the liquid produced becomes enriched in oxygen. This liquid is delivered to the middle portion of an auxiliary rectifier and serves first to liquefy by heat exchange the residual gaseous mixture from the vaporizer tubes. The liquid thus produced is utilized as a "reflux" entering at the top of the rectifier and flowing downwardly therein to complete the separation of oxygen in liquid form from the vapors arising from the vaporizer. The result is an effluent in which all of the argon and nitrogen in the crude oxygen product appear while the liquid which accumulates around the vaporizer tubes is substantially pure oxygen. The vapor which is drawn from the space around the tubes is one of the products of the operation, the pure nitrogen having been recovered as hereinbefore stated at the top of the primary rectifier.

Referring to the drawing, 5 indicates a column which is divided by partitions 6 and 7 into compartments 8, 9 and 10. The air, after it has been compressed and cooled, is delivered through a pipe 11 to an expansion engine 12 where it is expanded with external work and the cold expanded air is delivered by a pipe 13 to the compartment 8. A portion of the cold compressed air is delivered by a pipe 14 to a liquefier 15, the details of which will be described more fully hereinafter. The liquid produced passes through a pipe 16 controlled by a valve 17 to the compartment 8, being delivered preferably above a series of trays 18, such as are used commonly in rectification columns. The expanded air enters beneath the trays and passes upwardly therethrough in contact with the liquid from the liquefier 15 and also with liquid produced in tubes 19 which extend through the compartment 9. Liquid is produced in these tubes by the selective liquefaction of the gaseous mixture rising from the trays 18, and joins the liquid flowing downwardly through these trays.

The unliquefied gaseous residue from the tubes 19 escapes to a head 20 and passes thence through a pipe 21 to a condenser 22 located in the compartment 10. The gaseous residue liquefied in the condenser 22 by heat exchange with liquid surrounding it is delivered through a pipe 23 controlled by a valve 24 to the upper end of the compartment 10. This compartment contains a plurality of trays 25, such as are usually employed in rectifiers, and the liquid "reflux" flows downwardly over the trays until it joins the liquid which is delivered from the compartment 8 through a pipe 26 and valve 27. The combined liquids continue downwardly over the trays 25 while vapors rise therethrough from the compartment 9 where the liquid eventually accumulates on trays 25' surrounding the tubes 19.

By suitable regulation of the volume and pressure of the entering gaseous mixture and of the flow of liquids through the apparatus, the desired separation is accomplished in the rectifier and substantially pure nitrogen escapes as an effluent from the top of the rectifier through a pipe 28. The liquid which accumulates on the trays 25' and in the bottom of the compartment 9 is the crude oxygen product. It is vaporized by heat exchange with the gaseous mixture in the tubes, a portion of the vapor rising through the rectifier while another portion is withdrawn through a pipe 29.

The gaseous products of the separation are very cold and their refrigerative effect is utilized in the system to cool the incoming air and also to maintain the low temperature of the auxiliary cycle. The liquefier 15, comprising a shell enclosing a plurality of tubes 30 and 31, is thus utilized to liquefy a portion of the air. The crude oxygen product escaping through the pipe 29 is delivered to a compartment 32 at one end of the liquefier and passes through the tubes 30 to a similar compartment 33 from which it passes through a pipe 34 to a compartment 35 at one end of an exchanger 36 comprising a shell enclosing a plurality of tubes 37 and 38. The crude oxygen product passes from the compartment 35 through the tubes 37 to a corresponding compartment 39 at the opposite end of the exchanger and is thence delivered through a pipe 40 to a crude oxygen holder or gasometer 41.

The effluent escaping through the pipe 28 is, as we have indicated, one of the substantially pure products of the operation. As it leaves the rectifier it is at a relatively low temperature and the refrigerative effect is utilized to maintain the low temperature of the system. A portion of this effluent may be withdrawn through a pipe 42 which is controlled by a valve 43 and is delivered to a compartment 44 at one end of the liquefier 15. It passes through the tubes 31 to a corresponding compartment 45 at the opposite end of the liquefier and escapes thence through a pipe 46 to a compartment 47 at one end of the exchanger 36. It then passes through the tubes 38 in the exchanger to a compartment 48 at the opposite end thereof and is withdrawn through a pipe 49 and delivered to a suitable storage receptacle (not shown). The balance of the effluent passes through a pipe 50 to a compartment 51 at one end of an auxiliary liquefier 52, the function of which will be explained presently. This liquefier comprises a shell enclosing a plurality of tubes 53, and after passing through the tubes the effluent is delivered by a pipe 54 to the pipe 42 and mixes with the portion which was withdrawn through the valve 43. All of the effluent passes thus through the liquefier 15 and exchanger 36 before it leaves the system and is brought thereby to substantially atmospheric temperature.

In passing through the exchanger 36 the products of the primary rectification cool the incoming gaseous mixture, for example, air, which enters the exchanger through a pipe 55 and circulates about the baffles 56 in contact with the tubes 37 and 38. After being cooled the gaseous mixture is delivered by a pipe 57 to the pipes 11 and 14 leading to the expansion engine 12 and the liquefier 15 respectively.

The crude oxygen product is drawn from the holder 41 through a pipe 58 and is compressed in a compressor 59 to a suitable pressure, e. g., three to four atmospheres. The compressor is provided with the usual water cooling devices (not shown). After compression and cooling the crude oxygen product passes through a pipe 60 to an exchanger 61 comprising a shell and a plurality of tubes 62. The crude oxygen product travels about a plurality of baffles 63 in the exchanger and escapes through a pipe 64 to the liquefier 52. It travels about the baffles 65 therein in contact with the tubes 53 and is thus subjected to the cooling effect of the effluent from the primary rectification. Owing to the low temperature of the effluent and the difference in pressure existing between the gases, the crude oxygen product is partially liquefied and the liquid and vapor are delivered through a pipe 66 to a compartment 67 at the bottom of an auxiliary column 68. The latter column includes a vaporizing compartment 69 and a rectifier 70.

The vapor entering the compartment 67 passes upwardly through tubes 71 which are surrounded by liquid supported on trays 72' in the compartment 69. The liquid is evaporated and the resulting refrigerative effect causes a selective liquefaction of the vapor in the tubes 71. The liquid thus produced flows backwardly through the tubes and joins the liquid in the compartment while the unliquefied gaseous residue continues to a head 72. The liquid in the compartment 67 is delivered through the pipe 73 controlled by a valve 74 to an intermediate portion of the rectifier 70 and flows downwardly over trays 75 therein with resulting separation of nitrogen and argon, for example, and the production of a liquid consisting substantially of pure oxygen. This oxygen passes through a pipe 76 to the compartment 69 and comprises the liquid which is evaporated to maintain the refrigeration of the tubes 71.

To ensure the maximum separation of nitrogen and argon the unliquefied gaseous residue from the head 72 is delivered through a pipe 77 to a condenser 78 within the rectifier 70. The gaseous residue is liquefied therein by heat exchange with the liquid in the rectifier and is delivered through a pipe 79 controlled by a valve 80 to the upper end of the rectifier wherein it flows downwardly over the trays 75 therein.

As the result of the rectification an effluent consisting substantially of nitrogen and argon is withdrawn through a pipe 81 and delivered to a compartment 82 at one end of the exchanger 61. Passing thence through the tube 62' the effluent is delivered to a compartment 83 at the opposite end of the exchanger and to an outlet pipe 84.

A portion of the vapors from the bottom of the vaporizer compartment 69 is withdrawn through a pipe 85 controlled by a valve 86 and delivered to a compartment 87 at one end of the exchanger 61. These vapors, which constitute the substantially pure oxygen product, pass through the tube 62 to a compartment 88 at the opposite end of the exchanger and are withdrawn through a pipe 89 which may be connected to a suitable storage receptacle (not shown).

By the operation as described it is possible to separate in a substantially continuous manner the two important constituents of a ternary gaseous mixture and to reject another constituent, the operation being conducted under conditions which permit a high efficiency of separation. An important feature of the method is that one of the cold separated products of the main cycle is conducted first through the auxiliary liquefier and has its temperature raised before it enters the primary liquefier. Consequently the quantity of primary cycle fluid condensed in the primary liquefier is reduced and an increased amount thereof is available for expansion in the engine and subsequent condensation in the tubes of the vaporizer. This permits the production of an increased amount of uncondensed residual nitrogen of the required purity which is available when liquefied in the condenser for subsequent use as a reflux liquid in the top of the primary rectifier. This increased quantity of reflux makes it possible to vaporize all of the liquid collecting in the lower level of the primary rectifier and thus to increase the recovery of nitrogen. The cold which would be wasted otherwise in liquid rejected from the primary cycle thus serves to maintain the required refrigeration in the auxiliary cycle and consequently the power expenditure necessary to compress the gaseous mixture for the primary cycle is no greater when the auxiliary cycle is employed than when the primary cycle is operated alone. In order to purify the crude oxygen product of the nitrogen cycle the only power expenditure necessary is that required to compress the crude oxygen product to 3 to 5 atmospheres. The quantity of crude oxygen product to be purified is relatively small as compared with the quantity of the air from which it is derived and it is evident that the power necessary in the auxiliary cycle will be very small.

Various changes may be made in the details of operation and in the apparatus employed without departing from the invention or sacrificing any of the advantages thereof.

I claim:—

1. A method of separating the constituents of gaseous mixtures, which comprises producing a mixture in the gaseous phase impoverished in one of the constituents by a primary rectification, withdrawing the gaseous mixture, recompressing and liquefying the gaseous mixture, subjecting it to an auxiliary rectification to separate another constituent in substantial purity, and maintaining the low temperature of the auxiliary rectification by the application of refrigeration from the primary rectification.

2. A method of separating the constituents of gaseous mixtures, which comprises producing a mixture in the gaseous phase impoverished in one of the constituents by a primary rectification, withdrawing and recompressing the gaseous mixture, reliquefying the gaseous mixture by heat exchange with a product of the primary rectification, and subjecting the liquid to an auxiliary rectification to separate another constituent in substantial purity.

3. A method of separating the constituents of gaseous mixtures, which comprises producing a mixture in the gaseous phase impoverished in one of the constituents by a primary rectification, withdrawing and recompressing the gaseous mixture, subjecting it to an auxiliary rectification to produce a liquid enriched in another constituent and a gaseous effluent, maintaining the low temperature of the auxiliary rectification by application of refrigeration from the primary rectification, rejecting the effluent and evaporating the liquid by heat exchange with the recompressed gaseous mixture.

4. A method of separating the constituents of gaseous mixtures, which comprises producing a mixture in the gaseous phase impoverished in one of the constituents by a primary rectification, withdrawing the gaseous mixture, recompressing and liquefying the gaseous mixture, subjecting it to an auxiliary rectification to separate another constituent in substantial purity, and utilizing excess refrigeration from the primary rectification to maintain the refrigeration in the auxiliary rectification.

5. The method of separating the constituents of gaseous mixtures, which comprises subjecting the compressed and cooled mixture to a primary liquefaction and rectification to separate a gaseous effluent consisting of one of the constituents in substantial purity from a liquid containing all of the constituents, vaporizing the liquid, recompressing the vapor, and subjecting the vapor to an auxiliary liquefaction and rectification to separate a liquid consisting of another constituent in substantial purity from an effluent mixture of the constituents.

6. The method of separating the constituents of gaseous mixtures, which comprises subjecting the compressed and cooled mixture to a primary liquefaction and rectification to separate a gaseous effluent consisting of one of the constituents in substantial purity from a liquid containing all of the constituents, vaporizing the liquid, recompressing the vapor, subjecting the vapor to an auxiliary liquefaction and rectification to separate a liquid consisting of another constituent in substantial purity from an effluent mixture of the constituents and maintaining the refrigeration of the auxiliary liquefaction and rectification by heat transfer from the gaseous effluent from the primary rectification.

7. A method of separating the constituents of gaseous mixtures, which comprises subjecting the mixture to a primary liquefaction and rectification to separate a liquid impoverished in one of the constituents and a gaseous effluent consisting substantially of that constituent, vaporizing the impoverished liquid to produce a gaseous mixture of similar composition, subjecting this gaseous mixture to recompression and an auxiliary liquefaction and rectification, and increasing the quantity of gaseous effluent from the first rectification by withdrawing a portion of the refrigeration therefrom and utilizing it to maintain the second rectification.

8. A method of separating the constituents of air, which comprises producing a gaseous mixture impoverished in nitrogen by a primary rectification, withdrawing the gaseous mixture, recompressing and liquefying the gaseous mixture, and subjecting the liquid to an auxiliary rectification to separate a liquid consisting of substantially pure oxygen from an effluent containing the remaining constituents present in the impoverished gaseous mixture.

9. A method of separating the constituents of air, which comprises producing a gaseous mixture impoverished in nitrogen by a primary rectification, withdrawing the gaseous mixture, recompressing and liquefying the gaseous mixture, subjecting the liquid to an auxiliary rectification to separate a liquid consisting of substantially pure oxygen from an effluent containing the remaining constituents present in the impoverished gaseous mixture, and maintaining the auxiliary rectification by transfer of refrigeration from the primary rectification.

10. A method of separating the constituents of air, which comprises producing a gaseous mixture impoverished in nitrogen by a primary rectification, withdrawing the gaseous mixture, recompressing and liquefying the gaseous mixture, subjecting the liquid to an auxiliary rectification to separate a liquid consisting of substantially pure oxygen from an effluent containing the remaining constituents present in the impoverished gaseous mixture, rejecting the effluent and vaporizing the liquid oxygen.

11. In an apparatus for separating the constituents of gaseous mixtures, the combination of primary and auxiliary rectification columns, means for supplying the gaseous mixture to the primary column, means for recompressing a gaseous product of the first rectification means for delivering the recompressed gaseous product to the auxiliary rectification column, and means for maintaining the low temperature of the auxiliary rectification by the application of refrigeration from the primary rectification.

12. In an apparatus for separating the constituents of gaseous mixtures, the combination of primary and auxiliary rectification columns, means for supplying the gaseous mixture to the primary column, means for recompressing a gaseous product of the first rectification, means for delivering the recompressed gaseous product to the auxiliary rectification column and means for transferring refrigeration from another product of the first rectification to the auxiliary rectification column.

In testimony whereof I affix my signature.

CLAUDE C. VAN NUYS.